United States Patent [19]

Adachi

[11] Patent Number: 4,883,318
[45] Date of Patent: Nov. 28, 1989

[54] VEHICLE SEAT

[75] Inventor: Mitsuhiro Adachi, Akishimashi, Japan

[73] Assignee: Tachikawa Spring Co., Ltd., Tokyo, Japan

[21] Appl. No.: 105,995

[22] Filed: Oct. 13, 1987

Related U.S. Application Data

[63] Continuation of Ser. No. 878,312, Jun. 25, 1986, abandoned.

[51] Int. Cl.⁴ .................................................. A47C 3/00
[52] U.S. Cl. ..................................... 297/234; 297/259; 297/DIG. 1
[58] Field of Search ................. 297/DIG. 1, 284, 452, 297/458, 459

[56] References Cited

U.S. PATENT DOCUMENTS

| | | | |
|---|---|---|---|
| 3,052,459 | 9/1962 | Belsky | 297/284 X |
| 3,727,980 | 4/1973 | Tischler | 297/452 |
| 3,941,418 | 3/1976 | Bernard | 297/DIG. 1 |
| 4,491,365 | 1/1985 | Muragami | 297/284 X |
| 4,500,136 | 2/1985 | Murphy et al. | 297/284 |
| 4,583,781 | 4/1986 | Hatsutta et al. | 297/284 |

Primary Examiner—Francis K. Zugel
Attorney, Agent, or Firm—Oldham & Oldham

[57] ABSTRACT

An improved vehicle seat comprising a cushion member formed of foam material is disclosed which is provided with a frame-like shape-retaining member of a wire material embedded within the cushion member. The shape-retaining member includes a buttocks support element to which a peripheral element is pivotably connected for up and down rotation with respect to the buttocks support section to provide a continuous top sitting surface for the buttocks support element and the movable peripheral support sections.

6 Claims, 2 Drawing Sheets

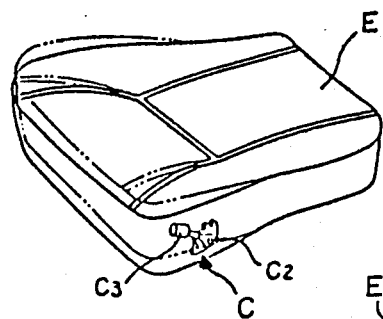
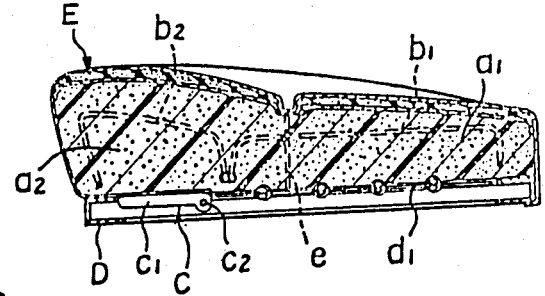
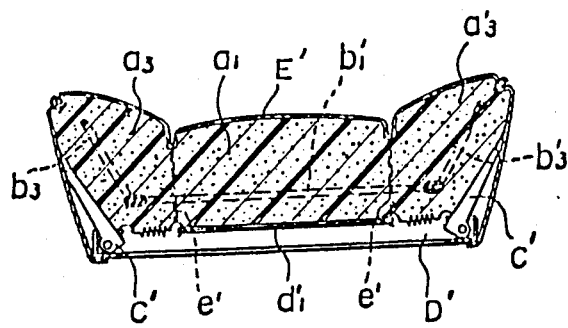
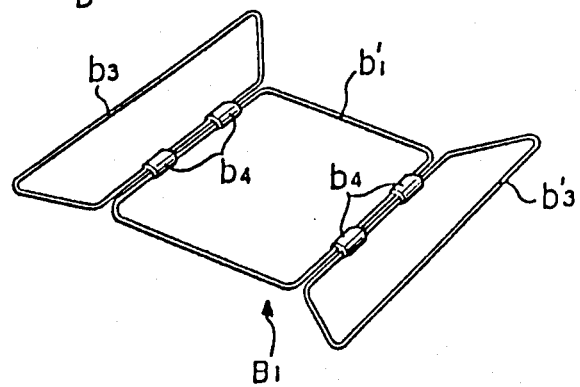

VEHICLE SEAT

This application is a continuation of application 878,312 filed June 25, 1986, now abandoned.

BACKGROUND OF THE INVENTION

1. Field of the Invention

The present invention relates to a vehicle seat and, more particularly, to an improved vehicle seat including thigh support sections or side support sections which are movable by lifting means and are formed of foam material such as polyurethane foam.

2. Description of the Prior Art

Referring to FIGS. 1(a) and 1(b), it can be seen that in conventional vehicle seats of this kind, a cushion member (A') formed of foam material has embedded integrally therein a frame-like wire member (B')(FIG. 1(b)), having a shape as shown in FIG. 1(a) to increase the rigidity of the peripheral portions of the cushion member (A'), so that good firm sitting feeling is achieved and good shape retention can be provided while the cushioning property can be changed according to the distribution of loads. Therefore, the conventional seat using such cushion member (A') distributes the locally centralized loads to provide improved sitting feeling. However, when a thigh support device is provided in the thigh support section of such cushion member (A'), it has been found that the cushion member (A') is raised up wholly. As a result of this, the thigh support device does not function effectively.

SUMMARY OF THE INVENTION

In view of the above conditions, the present invention is intended to eliminate the drawbacks in conventional vehicle seats as described above.

Accordingly, it is a primary object of the invention to provide an improved vehicle seat in which the shape of its top surface can be retained, and in which thigh support sections or side support sections thereof can be moved smoothly by a lifting means such as a thigh support device.

In order to attain the above object, in the present invention (as illustrated by its two embodiments) two frame-like shape-retaining members each formed of a wire material are embedded within the thigh support sections or side support sections and the bottom (or, buttocks) support section of a cushion member formed of foam material. The two shape-retaining members are constructed such that they can be pivotably connected to each other for rotation in a vertical direction whereby the thigh support sections or side support sections can be moved vertically by a lifting means relative to the bottom support section. Therefore, the thigh support sections, side support sections and bottom section of the cushion member are retained in shape by the shape-retaining members. Thus the cushion member is prevented from going out of shape, and the cushion thigh support sections and side support sections can be smoothly moved by the lifting means because the shape-retaining members embedded within the thigh support sections and side support sections are pivotably connected for rotation to the shape-retaining member embedded within the bottom support section of the cushion member.

It is another object of the invention to provide a vehicle seat which can be manufactured more simply than conventional prior art seats of this kind.

To accomplish this object, the seat of the invention can be formed by positioning two shape-retaining members pivotably connected for rotation with respect to each other in a mold for forming a cushion member and then foaming foam material therein.

These and other objects and advantages of the invention may be readily ascertained by referring to the following description and appended drawings.

BRIEF DESCRIPTION OF THE DRAWINGS

FIG. 2 is a perspective view of a first embodiment of the invention;

FIG. 3 is a longitudinal sectional view of the first embodiment of the invention;

FIG. 6 is a longitudinal sectional view of a second embodiment of the invention; and FIG. 7 is a perspective view of shape-retaining members employed in the second embodiment of the invention.

DETAILED DESCRIPTION OF PREFERRED EMBODIMENTS OF THE INVENTION

Figure 1:
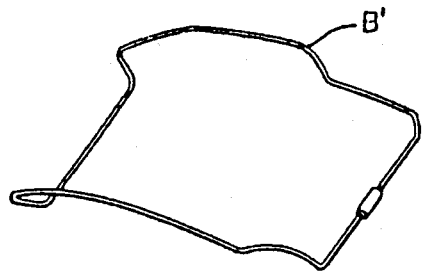
FIG. 1(a) is a perspective view of a shape-retaining member employed in a conventional vehicle seat.
FIG. 1(b) is a perspective view of the above shape-retaining member when it is embedded in a cushion member in the above-mentioned conventional vehicle seat.
Figure 1:
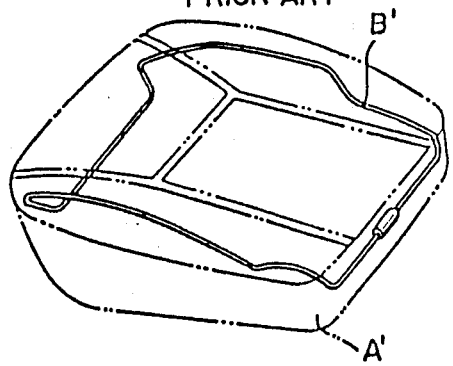

FIGS. 2 and 3, respectively, illustrate a vehicle seat of the invention incorporating a thigh support device therein. Referring to the drawings, a cushion member (A) formed of polyurethane foam is depicted with a shape-retaining member (B) integrally formed within the cushion member when the cushion member is formed. A lifting means (C) is shown along with a frame member (D) to carry the cushion member thereon, while top member (E) is illustrated as enclosing the cushion member (A).

Cushion member (A) includes a bottom support section (a1) and a thigh support cushion section (a2) formed integrally with the bottom support section. Bottom support section (a1) is fixed to the frame member (D) by means of the top member (E), while the thigh support section (a2) is not fixed to the frame member (D), but rather can be moved up or down by means of the lifting means (C).

The illustrated lifting means (C) includes a rotary plate (c1) positioned on the bottom surface of the thigh support section (a2), a rotary shaft (c2) fixed to one edge of the rotary plate (c1), and a lever (c3) fixed to the rotary shaft. Accordingly, when the lifting means (C) is operated, the lever (c3), which is fixed to the rotary shaft (c2), can be rotated about the rotary shaft (c2) so as to move the thigh support section (a2) up or down by means of the rotary plate (c1).

Figure 4:
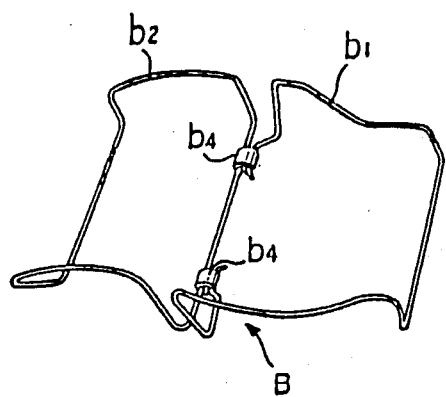
FIG. 4 is a perspective view of shape-retaining members employed in the first embodiment of the invention.
Figure 5:
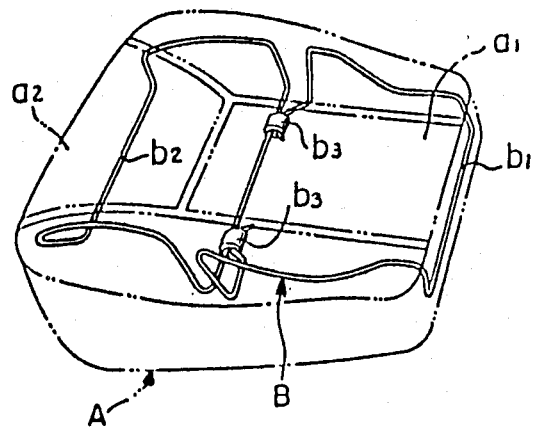
FIG. 5 is a perspective view of the above shape-retaining members of the invention when they are embedded in a cushion member of the invention.

Shape-retaining member (B) includes both a fixed element (b1) provided within the bottom support section (a1) of the cushion member (A), and a movable element (b2) provided within the thigh support section (a2) of the cushion member (A). Both support elements (b1) and (b2) extend around the peripheral portions of the above-mentioned cushion support sections (a1) and (a2), respectively. Each of the support elements can be a wire material formed into a frame-like configuration. And, the movable element (b2) can be mounted to the fixed element (b1) by clips (b4), or the like, so as to be free to pivotably rotate in a vertical direction (FIGS. 4 and 5).

Top member (E) can be a lamination of three components, that is, a top layer, a wadding, and a wadding cover, in which case the top surface of the top member (E) is connected to a spring member (d1) or the like for adjustment to the frame member (D) by means of a connecting member (e).

Accordingly, when the lever (c3) is operated to rotate the rotary shaft (c2), then the front portion of the seat is raised, as shown by two-dot chained lines in FIG. 2. When the lever (c3) is operated in the opposite direction, then the seat front portion is caused to return to its original position as shown by solid lines in FIG. 2. That is, the seat becomes one provided with the adjustable thigh support device of the present invention.

FIGS. 6 and 7 respectively illustrate another embodiment of the invention which is provided with adjustable side support device(s) capable of moving the right and left portions of the seat up or down. In this embodiment, side support sections (a3) and (a'3) are formed on the right and left, respectively, of, and integrally with, the bottom support portion (a1) of a cushion member (A'). Within the bottom support section (a1), and in each of these two side support sections (a3) and (a'3) there is embedded a shape-retaining member (B1), which is similar in operation to the above-mentioned first embodiment of the invention.

Shape-retaining member (B1) includes a fixed element (b'1) provided within the bottom support section (a1) and two movable elements (b3) and (b'3), respectively, pivotably connected by means of clips (b4) to the right and left portions of the fixed element (b'1) for rotation in the vertical direction. On the bottom surfaces of the two side support sections (a3) and (a'3) there are provided lifting means (C'), each of which is similar to that employed in the above-mentioned first embodiment of the invention. These lifting means (C') are adapted to move only the side support sections (a3) and (a'3) up or down as desired.

In FIG. 6, top member E' covers the top side surfaces of the side support sections (a3) and (a'3) and is assembled for expansion in a vertical direction. Reference characters (e'), designate vertical connecting members for attaching the top member (E') into the spring member (d'1) of the frame member (D').

As disclosed hereinbefore, according to the present invention, a shape-retaining member including a fixed element and a movable element pivotably connected for rotation to the fixed element can be embedded with a cushion member of urethane foam. The peripheral section of the cushion member, such as the thigh support section or side support sections where the movable element(s) is embedded, can be moved upwardly or downwardly by a lifting means. Therefore, since the peripheral support section(s), formed integrally with the bottom support section, can be moved up or down, it is possible to change the configuration of the surface of the seat to accommodate the needs of occupant.

Thus, the seat of the present invention can be used more comfortably than the conventional seat.

Currently, there is available in the market a prior art seat wherein only a thigh support section, which is not integrally formed with a bottom support section, can be moved up or down. Consequently, a difference in level results between the bottom and the thigh support section, which gives the occupants an uncomfortable sitting feeling. This prior art seat is also complicated in structure and, thus, cannot be produced with good efficiency. The present invention eliminates the foregoing drawbacks in the above-mentioned prior art seat.

What is claimed is:

1. A vehicle seat comprising:
   (a) a cushion member made of a foam material, said cushion member including a buttocks support section and a (peripheral) thigh support section, wherein both said buttock support section and said (peripheral) thigh support section are integrally formed with each other;
   (b) a shape-retaining frame-like member for retaining the shape of said cushion member, said shape-retaining member being wholly embedded within said cushion member and comprising a fixed frame-like element located in said buttocks support section of said cushion member and a movable frame-like element located in said (peripheral) thigh support section of said cushion member, the lateral edges of fixed and moveable elements being bent upwardly to conform to the peripheral contour of said cushion, and said movable element being pivotally connected for rotation to said fixed element so as to be movable vertically relative thereto; and
   (c) means for raising and lowering said movable frame-like element and said (peripheral) thigh support section of said cushion member therewith, said means being located at the bottom portion of said (peripheral) thigh support section, whereby said (peripheral) thigh support section can be pivotally adjusted up and down by vertical rotation with respect to said buttocks support section while maintaining a continuous sitting surface on said cushion member.

2. The vertical seat of claim 1 wherein said peripheral support section comprises a thigh support section which supports both thighs of a passenger simultaneously.

3. The vehicle seat of claim 1 wherein said seat includes two side support sections on the left and right hand sides of said buttocks support section.

4. The vehicle seat of claim 1 wherein said foam material is urethane foam material and said frame-like elements are made of wire stock.

5. The vehicle seat of claim 4 wherein said shape-retaining frame-like member is embedded in said cushion member by fixing said shape-retaining member in a mold for forming said cushion member and foaming said urethane material to form said cushion member.

6. The vehicle seat of claim 1 wherein said fixed element and said movable elements are connected to each other by means of clips.

* * * * *